Aug. 24, 1937.  E. E. HEWITT  2,091,046
FLUID PRESSURE BRAKE
Filed June 30, 1936  2 Sheets-Sheet 2
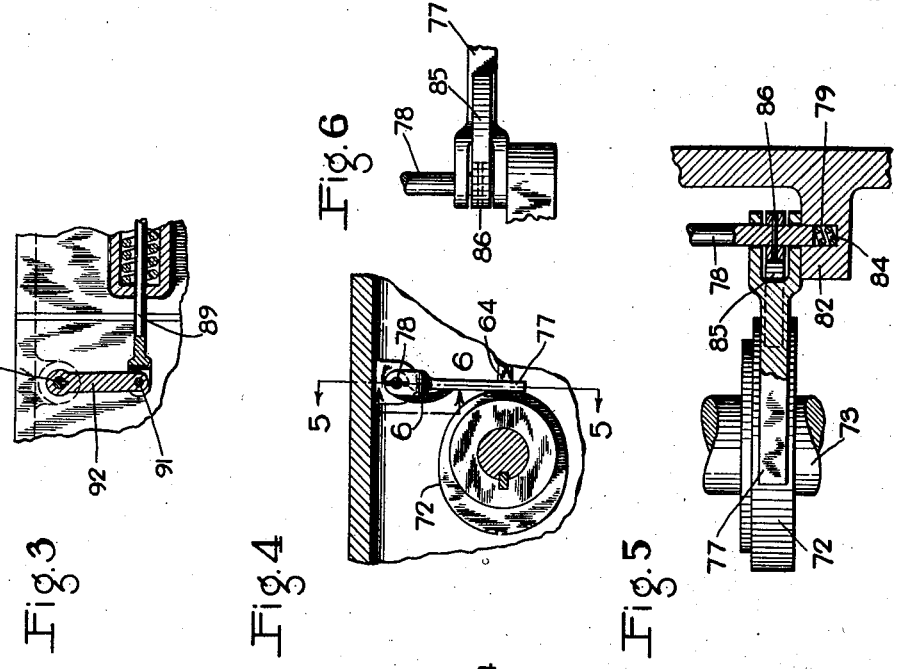
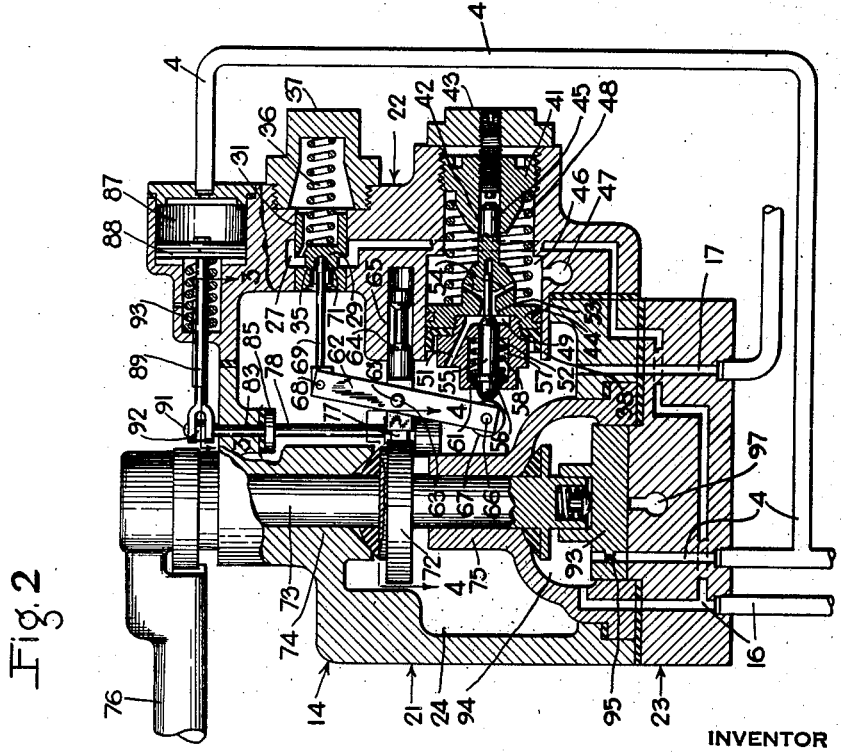
INVENTOR
ELLIS E. HEWITT
BY Wm. M. Cady
ATTORNEY Patented Aug. 24, 1937

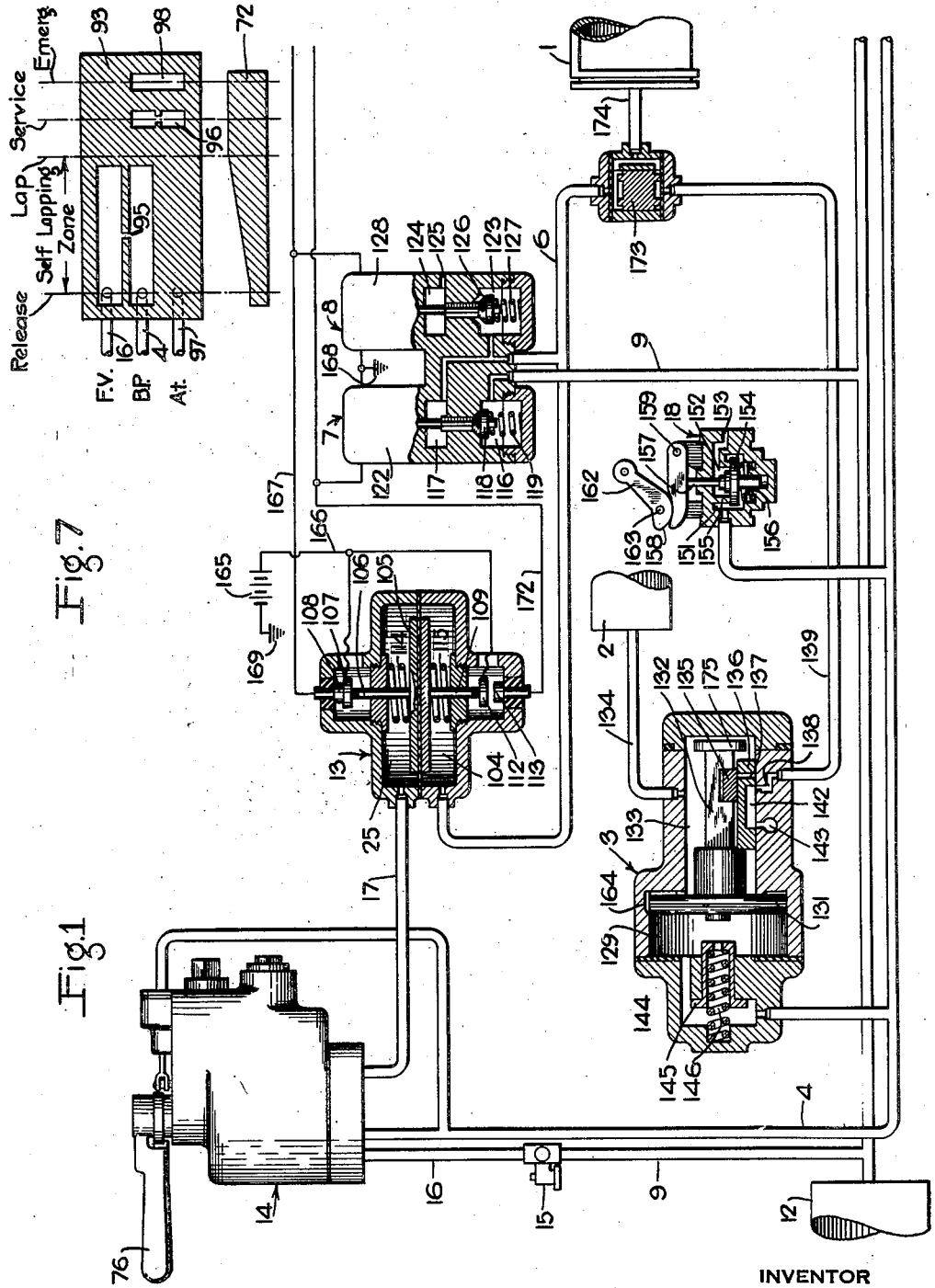

2,091,046

UNITED STATES PATENT OFFICE 2,091,046

FLUID PRESSURE BRAKE

Ellis E. Hewitt, Edgewood, Pa., assignor to The Westinghouse Air Brake Company, Wilmerding, Pa., a corporation of Pennsylvania Application June 30, 1936, Serial No. 88,097

8 Claims. (Cl. 303—15)

My invention relates to brake equipment for vehicles and more particularly to fluid pressure brake equipment that is particularly adapted for use on high speed traction vehicles.

In order to achieve the flexibility of control desirable on high speed trains, braking systems have been heretofore employed providing dual control means such as a straight air control portion and an automatic control portion, the straight air control portion lending itself readily to flexible brake control for normal service application of the brakes, and the automatic control portion being employed as a stand-by control equipment for effecting emergency braking.

The straight air control portion of such equipments may be provided with magnet valve devices at each braking unit for controlling the supply of fluid under pressure to, and the release of fluid under pressure from, a straight air pipe that is common to the several braking units of the train. This arrangement permits rapid changes in the straight air pipe pressure and assures uniform braking pressures since the several brake cylinders are all supplied with fluid under pressure in accordance with the fluid pressure developed in the common straight air pipe. In the case of the automatic brake portion, however, where a reduction in brake pipe pressure effects the supply of fluid under pressure to each brake cylinder from the associated auxiliary reservoir, there is a possibility that differences in pressure within the several brake cylinders will result, caused by leakage from the brake cylinders, variations in the piston travel, and the like, and which will produce different braking forces at different points in the train.

Brake valve devices have been provided for controlling such equipments having a self-lapping valve portion for controlling the straight air control portion of the equipment and a rotary valve portion for controlling the automatic portion of the equipment.

It is an object of my invention to provide braking equipment of the above indicated character that is quick acting both in applying and releasing the brakes, and that effects a uniform application of the brakes throughout the train whether initiated by the straight air or the automatic control portion.

It is a further object of my invention to provide, in a braking equipment of the above indicated character, means for effecting operation of the self-lapping brake valve portion to give an uncontrolled full brake cylinder pressure during an emergency brake application caused by a reduction in brake pipe pressure.

Other objects and advantages of my invention will be apparent from the following description of one preferred embodiment thereof taken in connection with the accompanying drawings in which, Fig. 1 is a diagrammatic view illustrating apparatus comprising one preferred embodiment of the invention, Fig. 2 is a sectional view of the brake valve device illustrated in Fig. 1, Fig. 3 is a sectional view taken on the line 3—3 in Fig. 2, Fig. 4 is a sectional view taken along the line 4—4 in Fig. 2, Fig. 5 is a view taken along the line 5—5 in Fig. 4, Fig. 6 is a detail view taken along the line 6—6 in Fig. 4, and Fig. 7 is a diagrammatic development showing the operation of the brake valve device.

Referring to the drawings, the brake cylinder 1 represents one unit of a brake equipment that may be supplied with fluid under pressure from an auxiliary reservoir 2, associated therewith, by operation of an automatic valve device 3 upon a reduction in pressure in the brake pipe 4 in a well known manner, and which brake cylinder may also be supplied with fluid under pressure in accordance with the fluid pressure developed in the straight air pipe 6 that is common to all braking units. The pressure in the straight air pipe 6 is controlled by application and release magnet valve devices 7 and 8, respectively, associated with each braking unit, for controlling the supply of fluid under pressure from a main reservoir pipe 9 and main reservoir 12 to the brake cylinder, and from the brake cylinder to the atmosphere, respectively, and which are in turn controlled by a master control differential relay device 13 that is governed in accordance with the operation of a brake valve device 14 for effecting the supply of fluid under pressure from the main reservoir 12 as supplied by a feed valve 15, at a reduced pressure, through a pipe 16 and a control pipe 17 leading to the upper chamber 25 of the master relay device 13. Conductor's valves 18 are provided at appropriate positions along the train to effect emergency application of the brakes from several points on the train should such be desired.

The brake valve device 14 may correspond with that disclosed and claimed in United States Patent No. 2,042,112, of Ewing K. Lynn and Rankin J. Bush, issued May 26, 1936, and assigned to the same assignee as this application. The brake valve device 14 (see Fig. 2) comprises a casing having a main body portion 21, a self-lapping valve portion 22, and a rotary valve or bracket portion 23, the three portions together defining a pressure chamber 24 that is in open communication through the pipe and passage 17 with the pressure chamber 25 of the master control relay 13.

The self-lapping valve portion 22 is provided with a supply valve chamber 27 to which the feed valve device 15 of the usual type supplies fluid under pressure at a reduced pressure from the main reservoir 12 through main reservoir pipe 9 and pipe and passage 16. A supply valve 29 is contained within the supply valve chamber 27 and is slidably disposed within a bore 31 in the casing to engage a seat 35 provided in the self-lapping valve portion of the casing. The supply valve 29 is subject to the pressure of a spring 36, one end of which engages the valve and the other end of which engages a nut 37 screw-threadedly attached within a bore in the self-lapping valve portion of the casing.

The self-lapping valve portion or section of the casing is also provided within a cylinder 38, which is open at one end to the pressure chamber 24, the other end of the cylinder being closed by an adjusting member 41 screw-threadedly attached within a bore in the self-lapping valve casing portion. The adjusting member 41 is provided with a central bore 42 which at its outer end is adapted to receive a screw-threaded cap member 43.

Operatively mounted in the cylinder 38 adjacent its open end is a movable abutment in the form of a piston 44 having a stem 45, slidably guided by the adjusting member 41 within the inner end of the bore 42. At one end of the piston 44 is a chamber 46 which is constantly open to the atmosphere through the exhaust port 47. A coil spring 48 is contained within the chamber 46 and is interposed between and engages the inner face of the piston 44 and the inner face of the adjusting member 41.

A release valve chamber 49 is provided within the piston 44 that is in open communication with the pressure chamber 24 through a passage 51. A release valve 52 is contained within the valve chamber 49 and is adapted to seat on the valve seat 53 formed on the piston, and which is operated to control communication between the valve chamber 49 and the chamber 46 through connecting passages 54 in the piston stem 45. The release valve is provided with a stem 55, the small end of which slides within a bore in the stem of the piston 44 and the larger end of which is provided with a collar 56, which slidably engages the piston within the central bore 57 and is subject to the pressure of the release valve spring 58 interposed between the engaging collar 56 and the annular flange 59 on the piston. Outward movement of the valve relative to the piston 44 is limited by the collar 56 which engages a stop flange 61 that is secured to the piston 44.

A mechanism is provided for controlling the operation of the supply valve 29 and the release valve 52 comprising spaced levers 62 that are pivotally mounted intermediate their ends on a pin 63 supported in a plunger 64 that is slidably guided within a bore 65 in the casing of the self-lapping valve portion 22.

The lower ends of the spaced levers 62 are connected together by a pin 66 which is loosely mounted within a roller 67 that is adapted to operate to engage the outer end of the release valve stem 55. The upper end of the spaced levers 62 are connected together by a pin 68 on which one end of the operating lever 69 is pivotally mounted, the opposite end of the rod operatively engaging the supply valve 29 within a recess 71 formed in its face.

For the purpose of operating the plunger 64 toward the right, there is provided an operating cam 72, mounted upon a shaft 73, that is carried in an upper bearing 74 and a lower bearing 75 and is arranged to be operated by the brake valve handle 76. As the handle 76 is moved progressively from its release position toward full service application position the cam 72 forces the plunger 64 progressively toward the right.

It will be appreciated that the force of the release valve spring 58 is less than the force of the supply valve spring 36 which is less than the force of the regulating spring 48. When the cam 72 and the plunger 64 are in their release positions, as shown in Fig. 2, the spring 46 forces the supply valve 29 toward the left to its seated position and the spring 58 forces the release valve 52 toward the left to its unseated position.

Inserted between the surface of the cam 72 and the end of the plunger 64 is one end of a lever 77, (see Figs. 2 to 5 inclusive) the other end of which is provided with openings through which extend a shaft 78, the lower end of which is pivotally supported within a bore 79 in a bracket 82 extending inwardly from the wall of the casing. The upper end of the shaft 78 extends through a bore 83 in the top of the casing section. A spring 84 is provided in the bore 79, one end of which engages the end of the bore and the other end of which engages the lower end of the shaft 78 to force it upwardly. A collar 85 is provided on the shaft adjacent the bore 83 to retain the shaft 78 within the bore 79. A finger 85 is fastened to the rod 79 by means of a pin 86 to effect movement of the lever 77 in a counterclockwise direction as viewed in Fig. 4 and the movement of the plunger 64 toward the right as viewed in Figs. 2 and 4, upon a corresponding movement of the shaft 78. A piston chamber 87 is provided in the upper part of the casing portion of the self-lapping valve section that is in constant open communication with the brake pipe 4 and which contains a piston 88 having a stem 89 that is connected by a pin 91 to one end of a crank 92, the other end of which is keyed to the shaft 78. A spring 90 is provided within the casing about the stem 89, one end of which engages the end of the casing and the other end of which engages the piston 88 for urging the piston 88 toward the right upon the reduction in pressure within the brake pipe 4 and the piston chamber 87 below its predetermined value.

To the lower end of the shaft 73 beneath the bearing 75 a rotary valve 93 is attached within the valve chamber 94 that is in constant communication with the main reservoir 12 through passage and pipe 16 and the main reservoir pipe 9. When the brake valve handle 76 is in its release position or in any position within the self-lapping zone the rotary valve 94 is also in communication through a restricted port 95 in the rotary valve 93 with the brake pipe and passage 4. A cavity 96 is provided in the rotary valve 93 for effecting a reduction in brake pipe pressure at a service rate when the handle 76 is in a service position for the rotary valve 93. A cavity 98 is provided in the rotary valve 93 for effecting a reduction in brake pipe pressure at an emergency rate when the handle 76 is in emergency position.

The master control differential relay device 13 comprises a casing containing the aforementioned chamber 24 in the upper portion thereof and a chamber 104 in the lower portion, the two chambers being separated by a diaphragm 105. The diaphragm is provided with an upwardly extending stem 106 that carries a movable contact member 107 that is adapted to engage a fixed contact member 108 for controlling the operation of the release magnet valve device 8 and with a downwardly extending stem 109 carrying a movable contact member 112 for engaging a fixed contact member 113 for controlling the operation of the application magnet valve devices 7. Centering springs 114 and 115 are provided on the upper and lower sides, respectively, of the diaphragm 105, the lower spring 115 having a slightly greater force than the spring 114 so as normally to maintain the contact members 107 and 108 in engagement when no pressure exists on either side of the diaphragm 105.

The application magnet valve device 7 comprises a casing containing an application valve chamber 116 that is in constant open communication with the main reservoir pipe 9, and a chamber 117 that is in constant open communication with the straight air pipe 6. An application valve 118 is contained within the chamber 115 and is urged toward its seat by a spring 119 therein, and is adapted to be urged downwardly from its seat by a magnet 122 in the upper part of the casing.

The release magnet valve device 8 comprises a chamber 123 that is in constant open communication with the straight air pipe 6, and a chamber 124 that is in constant open communication with the atmosphere through an exhaust port 125. A release valve 126 is provided within the chamber 123 and is urged toward its seat by a spring 127 therein, and is adapted to be forced downwardly from its seat by a magnet 128 in the upper part of the casing.

The automatic valve device 3 comprises a casing containing a piston chamber 129 containing a piston 131 having a stem 132 extending therefrom into a valve chamber 133 on the other side of the piston 131 and operatively engaging a pilot slide valve 135 and a main slide valve 136 contained within the slide valve chamber 133. A port 137 is provided in the main slide valve 136 that is adapted to be uncovered by movement of the pilot valve 135 toward the left to effect communication between the slide valve chamber 133 and pipe 139 through port 138 upon movement of the main valve 136 toward the left to bring the port 137 into registration with the port 138. A cavity 142 is provided in the main slide valve 136 that, in the illustrated position of the slide valve, effects communication from pipe 139 to the atmosphere through exhaust port 143. A graduating stem 144 is provided within a bore in the casing of the automatic valve device having a flange 145 to limit said movement toward the right, and is urged toward its illustrated position by a spring 146, one end of which engages within a cavity in the casing and the other end of which engages within a cavity in the graduating stem.

The conductor's valve 18 comprises a casing providing a chamber 151 that is in constant open communication with the brake pipe 4, and a chamber 152 that is in constant open communication with the atmosphere through exhaust port 153. A valve 154 is provided within the chamber 151, and is urged to its rib seat 155 by a spring 156 contained within the chamber 151, and is provided with an upwardly extending stem 157 that extends through a bore in the casing, and the upper end of which engages a valve lever 158 that is pivotally mounted on a pin 159 in a bracket extending upwardly from the casing. An operating lever 162 is provided mounted on a pin 163 in a bracket extending upwardly from the casing and is adapted upon movement in either position from its illustrated position to move the valve lever 158 downwardly against the stem 157 to force the valve 154 from its seat and effect communication from the brake pipe 4 to the atmosphere through the exhaust port 153.

*Charging the system*

Fluid under pressure flows from the main reservoir 12 to the main reservoir pipe 9 to charge the application valve chamber 116, and through pipe 16 as supplied by the feed valve device 15 to charge the supply valve chamber 27 in the self-lapping portion of the brake valve device. Fluid under pressure also flows from the pipe 16 through the rotary valve chamber 94 of the brake valve device, the restricted port 95, to charge the brake pipe 4. From the brake pipe 4 fluid under pressure flows to the piston chamber 87 in the upper portion of the brake valve device, to charge this chamber and force the piston 88 toward the left against the bias of the spring 90. Fluid under pressure also flows from the brake pipe 4 to the piston chamber 129 of the automatic valve device 3 and through feed groove 164 to charge the main slide valve chamber 133 and the auxiliary reservoir 2. The valve chamber 151 of the conductor's valve 18 is also charged from the brake pipe 4.

With the various parts of the equipment in their illustrated or release positions, no pressure will exist in the chambers 24 or 104 of the master relay device 13 and the contact members 107 and 108 will be in engagement due to the greater force of the spring 115 than of the spring 114. A circuit is thus completed from the battery 165 through conductor 166, the relay contact members 107 and 108, conductor 167, the windings of the magnets 128 of the several release magnet valve devices 8, to ground at 168 and to the grounded terminal 169 of the battery 165, thus energizing the magnet 128 and forcing the release valve 126 downwardly from its seat to effect communication between the straight air pipe 6 and the atmosphere through release valve chamber 123, chamber 124, and the exhaust port 125.

*Operation*

If the operator wishes to make a service application of the brakes the handle 76 of the brake valve device 14 is moved from its release position an amount depending upon the degree of application of the brakes desired. Upon the initial movement of the handle from its release position the sloping surface of the cam 72 urges the lever 77 away from the finger 85, as viewed in Fig. 4, against the plunger 64, forcing this plunger toward the right as viewed in Figs. 2 and 4.

The first part of this movement effects the compression of the release valve spring 58 and forces the release valve 52 to its seat, closing communication between the pressure chamber 24 and the atmosphere through the passages 51, 54, and the exhaust port 47. Further movement of the plunger 64 toward the right causes the spaced levers 62 to pivot about their lower ends, further movement of the roller 67 being prevented by the stiffness of the regulating spring 48, thus causing the rod 69 to force the supply valve 29 against the compression of the supply valve spring 36 to open communication between the main reservoir pipe and passage 16 and the pressure chamber 24 through the supply valve chamber 27, thus supplying fluid under pressure from the main reservoir 12 through the pressure chamber 24 to the chamber 25 in the upper part of the master relay valve device 13.

The pressure established in the pressure chamber 24 of the brake valve device and in the chamber 25 of the master relay device 13 is dependent upon the degree of movement of the brake valve lever 76 and of the plunger 64 from their release positions, since, when the pressure within the chamber 24 increases due to the flow of fluid thereto through the supply valve chamber 27, a like pressure is exerted on the chamber side of the piston 44 in opposition to the pressure exerted by the regulating spring 48. This pressure continues to build up until it becomes sufficient to force the piston 44 toward the right, thus relieving the pressure on the roller 67 and permitting the supply valve spring 66 to force a rod 69 toward the left, pivoting the lever 62 about the pivot 63 and moving the supply valve 29 into engagement with its seat 35.

The amount of pressure on the chamber side of the piston 44 that is necessary to effect sufficient movement of the piston 44 to cause the supply valve 29 to seat, is dependent upon the amount of movement of the operating lever 76 and of the plunger 64 from their release positions. The greater the movement of the operating lever 76 from its release position, the greater will be the amount of movement of the pivot pin 63 toward the right, and consequently, the greater will be the compression of the regulating spring 48 necessary to permit movement of the lever 62 and of the rod 69 to effect the seating of the supply valve 29. It will be apparent therefore that the brake valve device is self-lapping on a pressure basis, the degree of fluid pressure within the pressure chamber 24 necessary to effect movement of the valves to lap position being dependent upon the amount of movement of the operating lever 76 from its release position.

Fluid under pressure thus supplied to the chamber 25 of the relay device 13 forces the diaphragm 105 downwardly against the bias of the spring 115, separating the contact members 107 and 108 and interrupting the above traced circuit to the winding of the magnet 128 of the release magnet valve device 8, thus permitting the release valve 126 to be forced to its seat by the spring 127 and close communication between the straight air pipe 6 and the atmosphere through exhaust port 125. At the same time the contact member 112 is brought into engagement with the contact member 113, thus closing a circuit extending from the positive terminal of the battery 165 through conductor 166, the contact members 112 and 113, conductor 172, the winding of the magnet 122 of the application magnet valve devices 7, to ground at 168, and to the grounded terminal 169 of the battery 165. The magnet 122, thus energized, forces the application valve 118 downwardly against the bias of the spring 119 to open communication between the main reservoir pipe 9 and the brake cylinder 1, through chambers 116, 117, straight air pipe 6, past the double check valve 173 in its lower or illustrated position, and brake cylinder pipe 174.

As fluid under pressure is thus supplied to the straight air pipe 6 and the several brake cylinders 1 through the several application magnet valve devices 7 associated with the several braking units of the train, and to the chamber 104 of the master relay control device 17, the differential pressures in the chambers 104 and 25 decreases until the brake cylinder pressure has built up sufficiently that the pressure within the chamber 104 is sufficient to move the diaphragm 105 upwardly to separate the contact members 112 and 113 and deenergize the winding of the magnets 122 of the application magnet valve devices 7, permitting them to seat under the bias of the springs 119 to close communication from the main reservoir pipe 9 to the straight air pipe 6. So long as the pressure in the chambers 25 and 104 corresponds sufficiently that the contact members 107 and 112 are both out of engagement with the contact members 108 and 113, respectively, both the application valve 118 and the release valve 126 remain in their lap positions and the brake cylinder pressure corresponds to the pressure within the pressure chamber 24 of the brake valve device and chamber 25 of the master relay control device 13.

If the operator wishes to release the brakes the handle 76 is moved to release position, thus moving the cam 72 away from the plunger 64 and permitting the release valve spring 58 acting against the release valve stem 55 to force the roller 67 and the spaced lever 62 toward the left to unseat the release valve 52 and permit the flow of fluid under pressure from the pressure chamber 24 to the atmosphere through the passages 51, 54 and the exhaust port 47, and consequently, from the chamber 25 of the master relay control device 13.

Upon such release of fluid under pressure from the chamber 25 the diaphragm 105 moves upwardly to its illustrated position by the greater pressure existing in the chamber 104, causing engagement of the contact members 107 and 108 and the completion of the above traced circuit through the winding of the magnet 128 of the release magnet valve device 8, thus energizing the magnet 128 and forcing the release valve 126 downwardly from its seat against the bias of the spring 127 to effect communication between the brake cylinder 1 and the atmosphere through the straight air pipe 6, chambers 123 and 124 of the release magnet valve device 8, and exhaust port 125.

If the self-lapping portion of the equipment fails for any reason, such, for example, as failure of battery power, an automatic service application of the brakes may be made by moving the brake valve lever 76 from release position, through the self-lapping service application zone, to the automatic service application position to bring the cavity 96 in the rotary valve 93 to a position to effect communication from the brake pipe 4 to the atmosphere to effect a reduction in brake pipe pressure at a service rate. This reduction in brake pipe pressure and in the pressure within the piston chamber 127 of the automatic valve device 3 causes the piston 164 to be moved by the greater pressure on the slide valve chamber side of the piston toward the left into engagement with the graduating stem 145, the piston stem 132 moving the graduating slide valve 135 to uncover the end of the port 137 through the main slide valve 136 and the finger 175 on the piston stem 132 engaging the end of the main slide valve 136 and moving it toward the left to bring the port 137 therein into registration with the port 138 in the slide valve seat, thus effecting communication from the auxiliary reservoir 2 through auxiliary reservoir pipe 134, slide valve chamber 133, pipe 139, past the double check valve 173 in its raised position, and through brake cylinder pipe 174 to brake cylinder 1. As the pressure within the auxiliary reservoir 2 and in the slide valve chamber 133 is thus reduced to a value corresponding to the pressure within the piston chamber 129 the piston 131 will be moved slightly toward the right so that the main slide valve 136 will lap the port 138 to close communication from the auxiliary reservoir 2 to the brake cylinder 1 and thus effect a brake cylinder pressure corresponding to the amount of reduction in brake pipe pressure in a well known manner.

If the operator wishes to make an automatic emergency application of the brakes, the handle 76 is moved to the automatic emergency application position, thus bringing cavity 98 in the rotary valve 93 to a position to effect communication from a brake pipe 4 to the atmosphere through exhaust port 97 at an emergency rate, thus creating a greater pressure differential between the pressures on the two sides of the piston 131 of the automatic valve device 3, so that the pressure on the slide valve side of the piston will be sufficient to force the piston against the graduating stem 144 and compress the graduating spring 146 to move the main slide valve 136 toward the left sufficiently that the end of the valve 136 uncovers the port 138 and effects a more rapid supply of fluid under pressure from the auxiliary reservoir 2 to the pipe 139 than is effected when the air is supplied through the port 137 in the main slide valve. When the pressure in the auxiliary reservoir 2 and the main slide valve chamber 133 has reduced sufficiently to effect a substantial balance of pressure on the two sides of the piston 131 the piston will move slightly toward the right to again lap the port 138 and close communication between the auxiliary reservoir 2 and the brake cylinder 1.

If the straight air portion of the brake valve device 14 is in operative condition, the movement of the handle 76 as above described causes the cam 72 to actuate the self-lapping portion of the brake valve device to supply fluid under pressure to the straight air pipe 6 at a faster rate and to a higher pressure than supplied to the pipe 139, thus causing the double check valve 173 to be held in its lower position to permit the supply of fluid under pressure from the straight air pipe 6 to the cylinder 1. If, for any reason, the self-lapping portion of the brake valve device 14 fails to operate as desired to supply fluid under pressure to the straight air pipe 6, fluid under pressure will be supplied to the brake cylinder 1 from the pipe 139 past the check valve 173 in its upper position.

If the operator wishes to release the brakes after an automatic application the handle 76 will be returned to release position to effect the supply of fluid under pressure from the main reservoir 12 to the brake pipe 4 through the restricted port 95 in the rotary valve 93 in the manner above described for charging the system. As the pressure builds up in the brake pipe 4 it will correspondingly build up in the piston chamber 129 of the automatic valve device 3, thus forcing the piston 131 towards its illustrated position and effecting movement of the main slide valve 136 to its illustrated position to effect communication from the brake cylinder 1 to the atmosphere through the brake cylinder pipe 174, pipe 139, port 138, the cavity 142 in the main slide valve 136, and to the atmosphere through exhaust port 143.

If, for any reason, the conductor or trainmen on any of the cars of the train wish to make an emergency application of the brakes, the operating lever 164 of the conductor's valve on a car will be moved in either direction from its illustrated position, thus forcing the valve lever 158 downwardly against the stem 157 of the valve 154 to force the valve from its seat and effect communication to the atmosphere from the brake pipe 4 to cause a reduction in brake pipe pressure at an emergency rate. As the brake pipe pressure is reduced, the pressure within the piston chamber 129 of the auxiliary valve device 3 and also within the piston chamber 87 of the brake valve device 14 is correspondingly reduced. The reduction in pressure in piston chamber 129 will effect the operation of the automatic valve device 3 in the manner above described to supply fluid under pressure to the brake cylinder through pipe 139.

The reduction in pressure in the piston chamber 87 of the brake valve device 14 permits the spring 93 to force the piston 88 toward the right, thus actuating the lever 92, shaft 78, and the lever 77 in a counter-clockwise direction as viewed in Figs. 3 and 4 to force the plunger 64 toward the right as viewed in Figs. 2 and 4 to effect a full service application of the brakes through the self-lapping portion of the brake valve device 14 in the manner above described for a service application. Fluid under pressure is thus supplied to the straight air pipe 6 and will ordinarily build up within the straight air pipe 6 at a faster rate and to a higher degree than within the pipe 139, thus effecting the supply of fluid under pressure to the brake cylinder 1 from the straight air pipe 6, the check valve 173 moving away from the supply having the greater pressure. Upon a subsequent increase in brake pipe pressure to its normal value the pressure within the piston chamber 129 of the auxiliary valve device 3 and the piston chamber 87 in the brake valve device 14 will be correspondingly increased, the piston 131 being moved to its illustrated or release position and the piston 88 being moved to its illustrated position against the bias of the spring 90 to permit the lever 77 to be moved in a clockwise direction against the surface of the cam 72, the several parts of the self-lapping mechanism being returned to their illustrated or release positions by the force of the springs 36, 58, and 48 as above described.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a brake equipment for vehicles having a straight air portion and an automatic portion including a brake pipe, in combination, a manually operable brake valve device having a self-lapping portion for controlling said straight air portion and a valve for controlling brake pipe pressure to control said automatic portion, and means comprising a spring pressed abutment subject to brake pipe pressure for actuating the self-lapping portion of said brake valve to a brake applying position upon a reduction in brake pipe pressure.

2. In a brake equipment for vehicles, in combination, means for effecting straight air application of the brakes, means including a brake pipe for effecting automatic application of the brakes, a brake valve device having a self-lapping portion, a rotary valve portion, and manual means for operating said two valve portions, and automatic means subject to a reduction in brake pipe pressure for operating said self-lapping portion.

3. In a brake equipment for vehicles, in combination, a plurality of braking units having a brake cylinder, a straight air portion for controlling the supply of fluid under pressure to said brake cylinder comprising a straight air pipe common to all braking units and magnet valve means associated with each unit for controlling said straight air pipe pressure, an automatic portion for controlling the supply of fluid under pressure to said brake cylinders comprising a brake pipe common to all braking units and an automatic valve device associated with each unit, a brake valve device for controlling straight air pipe pressure and brake pipe pressure, and automatic means responsive to a reduction in brake pipe pressure for actuating said brake valve device for effecting the supply of fluid under pressure to said straight air pipe.

4. In a brake equipment for vehicles, in combination, a plurality of braking units each including a brake cylinder, means including a brake pipe and an automatic valve device associated therewith for controlling the supply of fluid under pressure to said brake cylinder, means including a straight air pipe for controlling the supply of fluid under pressure to said brake cylinders, magnet valve devices associated with each braking unit for controlling straight air pipe pressure, manually operable valve means for controlling said magnet valve devices and brake pipe pressure, and automatic means responsive to a predetermined reduction in brake pipe pressure for controlling said valve means to operate said magnet valve devices to effect a straight air application of the brakes independently of the movement of said manually operable means from its release position.

5. In a brake equipment for vehicles, in combination, a plurality of braking units each including a brake cylinder, means including a brake pipe and an automatic valve associated with each brake cylinder, for controlling the supply of fluid under pressure to said brake cylinder, means including a straight air pipe for controlling the supply of fluid under pressure to said brake cylinders, a manually operable brake valve device having a portion for controlling straight air pipe pressure and a portion for controlling brake pipe pressure, and automatic means contained within said brake valve device and responsive to a predetermined reduction in brake pipe pressure for actuating said brake valve device to effect the supply of fluid under pressure to said straight air pipe.

6. In a brake equipment for vehicles, in combination, a plurality of braking units each including a brake cylinder, means including a brake pipe common to all braking units and an automatic valve associated with each brake cylinder for controlling the supply of fluid under pressure to said brake cylinders, means including a straight air pipe for controlling the supply of fluid under pressure to said brake cylinders, a brake valve device having a self-lapping portion and a portion for controlling brake pipe pressure, manually operable means for operating said brake valve device, and means subject to brake pipe pressure and normally held thereby in an inactive position for actuating said self-lapping portion to effect a straight air application of the brakes upon a predetermined reduction in brake pipe pressure.

7. In a brake equipment for vehicles, in combination, a plurality of braking units each including a brake cylinder, means including a brake pipe common to all braking units and an automatic valve device associated with the several brake cylinders for controlling the supply of fluid under pressure to said brake cylinders, means including a straight air pipe for controlling the supply of fluid under pressure to said brake cylinders, a manually operable brake valve device having a self-lapping portion for controlling straight air pipe pressure and a portion for controlling brake pipe pressure, and a cylinder therein subject to brake pipe pressure and containing a movable abutment operatively connected to said self-lapping portion, said abutment being subject on one side to a constant force and on the other side to brake pipe pressure and operative upon a predetermined reduction in brake pipe pressure to actuate said self-lapping portion to full application position.

8. In a brake equipment for vehicles, in combination, a brake cylinder, an automatic brake portion including a brake pipe and an automatic valve device for controlling the supply of fluid under pressure to said brake cylinder, a self-lapping portion including a straight air pipe for controlling the supply of fluid under pressure to said brake cylinders, a brake valve device having a manually operable shaft, a valve actuated thereby for controlling brake pipe pressure, a cam thereon and self-lapping valve means including a plunger actuated by said cam for controlling said straight air pipe pressure, means disposed between said cam and said plunger, and actuating means therefor for operating said self-lapping valve means to application position upon a reduction in brake pipe pressure.

ELLIS E. HEWITT.